(12) United States Patent
Jönsson et al.

(10) Patent No.: US 8,494,558 B2
(45) Date of Patent: Jul. 23, 2013

(54) COMMUNICATION PERFORMANCE GUIDANCE IN A USER TERMINAL

(75) Inventors: Tomas Jönsson, Luleå (SE); Kjell Larsson, Luleå (SE); Peter Ökvist, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/519,366

(22) PCT Filed: Feb. 23, 2010

(86) PCT No.: PCT/SE2010/050203
§ 371 (c)(1),
(2), (4) Date: Jun. 27, 2012

(87) PCT Pub. No.: WO2011/105936
PCT Pub. Date: Sep. 1, 2011

(65) Prior Publication Data
US 2012/0309418 A1 Dec. 6, 2012

(51) Int. Cl.
*H04W 24/00* (2009.01)
(52) U.S. Cl.
USPC ............... 455/456.2; 455/456.1; 455/446; 455/41.2; 370/480; 342/368
(58) Field of Classification Search
USPC ............ 455/517, 450, 452.2, 452.1, 277.1, 455/13.3, 404.2, 41.2, 457, 456.1, 456.2, 455/446, 226.1; 370/334, 328, 278, 252, 370/329, 480; 375/295, 260, 267, 345; 714/748; 342/432, 367, 368
See application file for complete search history.

(56) References Cited

U.S. PATENT DOCUMENTS

| 6,778,824 | B2 * | 8/2004 | Wonak et al. | 455/426.2 |
| 7,142,870 | B2 * | 11/2006 | Kim | 455/456.1 |
| 7,251,484 | B2 * | 7/2007 | Aslanian | 455/426.1 |
| 7,987,003 | B2 * | 7/2011 | Hoffberg et al. | 700/17 |
| 8,175,545 | B2 * | 5/2012 | Rofougaran | 455/77 |
| 2004/0072577 | A1 * | 4/2004 | Myllymaki et al. | 455/456.1 |
| 2004/0236547 | A1 * | 11/2004 | Rappaport et al. | 703/2 |
| 2005/0245275 | A1 | 11/2005 | Byford | |
| 2007/0010259 | A1 * | 1/2007 | Hoffmann | 455/456.1 |
| 2009/0054074 | A1 * | 2/2009 | Aaron | 455/452.2 |
| 2009/0111518 | A1 * | 4/2009 | Agrawal et al. | 455/557 |
| 2009/0160707 | A1 * | 6/2009 | Lakkis | 342/367 |

FOREIGN PATENT DOCUMENTS

EP 1235451 A1 8/2002

* cited by examiner

*Primary Examiner* — Mahendra Patel
(74) *Attorney, Agent, or Firm* — Murphy, Bilak & Homiller, PLLC

(57) ABSTRACT

A user terminal (100, 200, 300, 400), a UE, for a wireless communications system. The UE comprises an antenna unit (130) and a receiver unit (125) for receiving signals on a radio channel within the system. The UE also comprises a sensor (115) for sensing the position of the UE and for generating an output signal indicative of said position. The UE further comprises an evaluation unit (120) which is arranged to measure the UE's communication performance over the channel and to also receive the output signal from the sensor and to generate a first control signal (S1) which indicates if altering the position of at least part of the UE, and thereby the position of the UE's antenna unit (130), will result in an increased communication performance over the channel for the UE.

13 Claims, 5 Drawing Sheets

US 8,494,558 B2

COMMUNICATION PERFORMANCE GUIDANCE IN A USER TERMINAL

TECHNICAL FIELD

The present invention discloses an improved user terminal, a UE, in particular for use in a MIMO communications system, i.e. a communications system which uses Multiple Input, Multiple Output technology.

BACKGROUND

In modern wireless communications systems, use is often made of so called MIMO technology, Multiple Input, Multiple Output. In MIMO technology, use is made of a wireless communications channel, i.e. a radio channel, in order to transmit two or more data streams simultaneously. A user terminal, a UE within a MIMO system, is equipped with a plurality of antennas in order to receive the various MIMO data streams. The number of MIMO streams supported by the radio channel at a given moment is referred to as the MIMO rank of the radio channel.

The MIMO rank of the radio channel varies continuously, and a radio channel with a high rank (i.e. strong signal, low interference and different channel propagation between the transmitter antennas and receiver antennas) will enable the use of more MIMO streams, and conversely, poor radio channel conditions and a low degree of scatter in the radio propagation environment (lower rank) will make it necessary to use fewer MIMO streams; in fact, sometimes only one stream will be supported, i.e. the MIMO rank will be one.

The radio channel conditions which offer a higher or a lower MIMO rank will change as a user moves within the system. Often, even a small move will change the channel conditions so that a different MIMO rank is supported, either in the case of improved channel conditions which will enable a transition to additional MIMO stream(s), or in the case of deteriorating channel conditions which necessitate a transition to a fewer MIMO stream(s).

The very same radio channel conditions which vary with a user's movements within a system and cause transitions to lower or higher MIMO ranks also apply for the case of communication without MIMO technology, i.e. in effect corresponding to a system with a MIMO rank of one.

US Patent Application 2008/0318626 A1 discloses a mobile communication device with a motion sensor for generating motion signals which are sent to a game device.

US Patent Application 2008/0318626 A1 discloses a circuit which comprises an on-chip gyro which generates a motion parameter based on the motion of the circuit, as well as a GPS receiver that generates GPS position data for the circuit. Based on the motion parameter, motion data are produced, and based on the GPS position data together with the motion data, position information is generated.

SUMMARY

As has emerged from the text above, there is a need for a solution to the problem of varying radio channel conditions due to a user's movements within the system, in particular movements which lead the user to a stationary or semi-stationary position in the system. The solution should be applicable both in MIMO systems and in communication systems which do not utilize MIMO technology.

Such a solution is offered by the present invention in that it discloses a user terminal for a wireless communications system. The UE of the invention comprises an antenna unit and a receiver unit for receiving signals on a radio channel within the system. In addition, the UE also comprises a sensor for sensing the position of the UE and for generating an output signal indicative of this position.

According to the invention, the UE further comprises an evaluation unit which is arranged to measure the UE's communication performance over the radio channel and to also receive the output signal from the sensor and to generate a first control signal which indicates if altering the position of at least part of the UE, and thereby the position of the UE's antenna unit, will result in an increased communication performance over the radio channel for the UE.

Thus, as opposed to prior art, and in order to facilitate improved communications conditions for the UE, a UE of the invention will be able to make a user of the UE aware of changes in the UE's position which will improve the UE's communication performance over the channel.

In one embodiment of the invention, the UE is also arranged for MIMO, Multiple Input, Multiple Output, use within the wireless communications system, and the UE's antenna unit and receiver unit are arranged to receive signals on the channel with varying channel MIMO rank. In this embodiment, the evaluation unit of the UE is also arranged to measure the channel rank of the signals on the radio channel as received by the UE and to also let the first control signal indicate if altering the position of the UE will result in increased communication performance for the UE by means of obtaining an altered radio channel MIMO rank.

In one embodiment of the invention, the evaluation unit is arranged to use at least one of the following parameters when measuring the UE's communication performance over the radio channel and when generating the first control signal:

the data throughput in the UE, the delay for received data in the UE, the bit error rate for received data in the UE, the bit rate for received data in the UE, the bit error pattern for received data in the UE, Channel Quality Indicator, CQI statistics)

In one embodiment of the invention, the position which the sensor of the UE is arranged to sense is the geographical position of the UE.

In one embodiment of the invention, the position which the sensor is arranged to sense is the rotational position of the UE. This is due to the fact that a UE can retain its geographical position while being rotated.

In one embodiment of the invention, the evaluation unit is arranged to generate the first control signal by comparing the UE's communication performance at its current position against one or both of:

A measured communication performance in at least one previous position of the UE, A calculated communication performance in an alternative position of the UE.

In one embodiment of the invention, the evaluation unit of the UE is also arranged to sample the communication performance of the UE at different positions, rotational or geographical, during movement of the UE and to include information about such samples in its output signal, and the evaluation unit is arranged to use this information in generating the first control signal.

BRIEF DESCRIPTION OF THE DRAWINGS

The invention will be described in more detail in the following, with reference to the appended drawings, in which.

DETAILED DESCRIPTION

Figure 1:
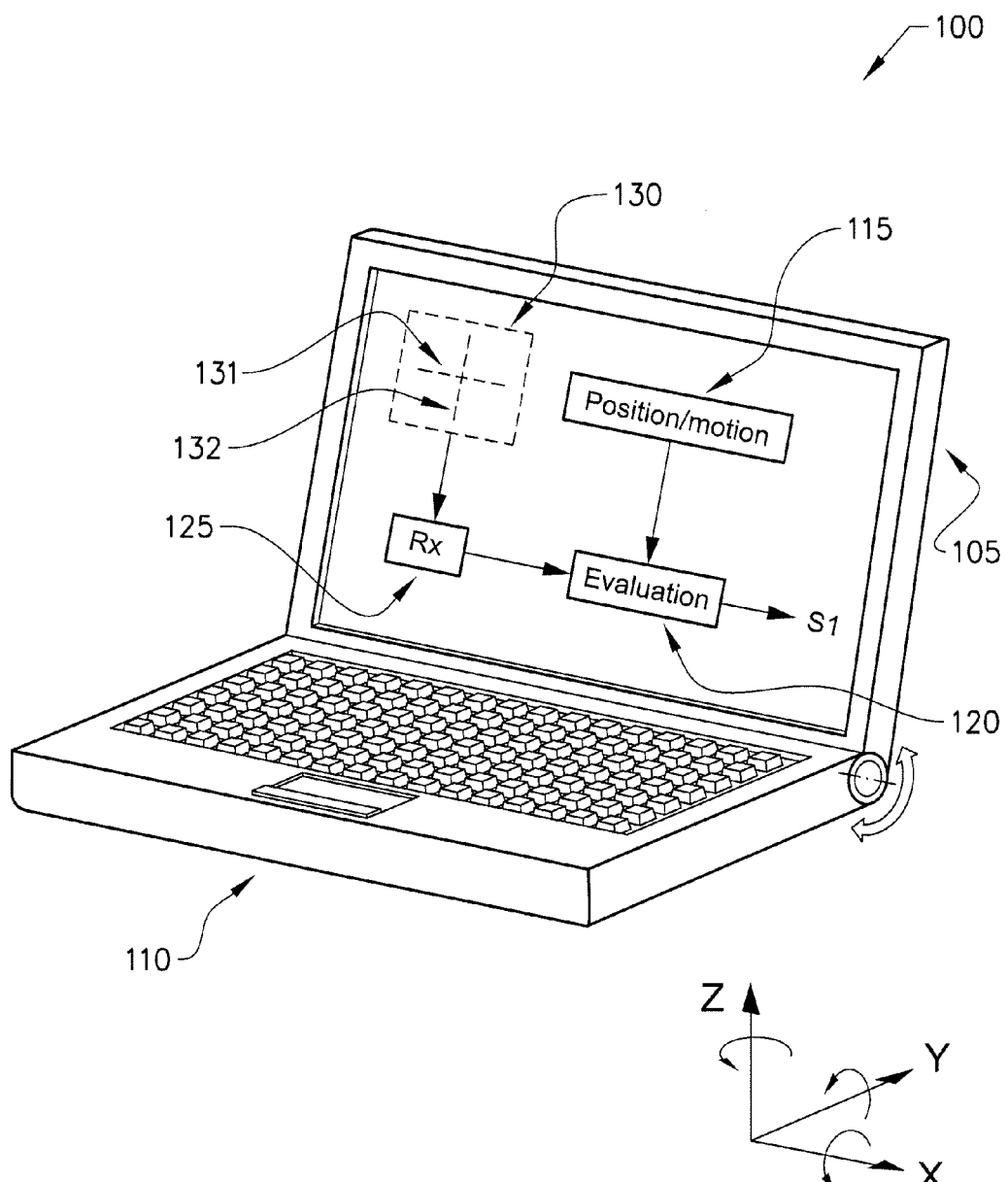
FIGS. 1-5 show various embodiments of the invention.

The invention will be described in detail below with reference to the appended drawings in FIGS. 1-5, in which the invention is shown as being embodied in a portable computer with a foldable lid, a so called laptop or notebook computer. However, it should be made clear that this is only an example intended to facilitate the description of the invention as well as the reader's understanding of the invention, and should not be used to restrict the scope of protection sought for and granted to the present invention. The invention can be applied in a wide variety of portable or mobile devices in a wireless communications network, usually but not exclusively a cellular communications network. Another non-exclusive example of a device other than portable computers in which the invention can be applied is a telephone in a wireless communications network. The device in which the invention is applied will in the description below be referred to by means of the generic term "User Equipment", UE. In FIGS. 1-5, components which have been shown in one drawing have retained the reference number from the drawing in which they were first shown.

Turning now to FIG. 1, there is shown a first embodiment of the invention, a UE 100 which is a so called laptop computer. The UE 100 comprises a keyboard part 110 and a foldable lid 105 which can be moved about an axis to alter the angle between the lid and the keyboard. The UE 100 also comprises (shown as being positioned in the lid) an antenna unit 130 and a receiver unit 125, which are used for receiving signals on a radio channel within a wireless communications system. The UE 100 also comprises a sensor unit 115 which is used to sense the position of the UE.

The position which is sensed by the sensor unit 115 of the UE can be of different kinds in different embodiments, as is exemplified by means of a coordinate system in FIG. 1, with a curved arrow about each axis: the sensed position can be two-dimensional, i.e. in one or both of two directions (two of x, y, z) which are orthogonal towards each other, or three dimensional, i.e. in one or more of three directions (x, y, z) which are orthogonal towards each other. In addition, as shown by means of the curved arrows, the position which is sensed can also in some embodiments include rotational movement about one or more of the x, y, z-axes in the coordinate system.

This can also be expressed as saying that the position which the sensor 115 is arranged to sense is the geographical position of the UE and/or the rotational position of the UE.

The sensor 115 can be of a wide variety of such sensors for such purposes, but examples of sensor types include gyros which can be chosen from a wide variety of different kinds of gyros, but can suitably be exemplified by such embodiments as an on-chip gyrator implemented with micro-electromechanical systems (MEMS) technology to form a piezoelectric gyroscope, a vibrating wheel gyroscope, a tuning fork gyroscope, a hemispherical resonator gyroscope, or a rotating wheel gyroscope along one, two or three axes to indicate motion in one, two or three dimensions.

The position which is sensed by the sensor unit 115 is output as a signal which is connected to an evaluation unit 120 of the UE. As shown in FIG. 1, the evaluation unit 120 also receives input from the receiver unit 125 of the UE 115. By means of the input from the receiver unit 125, the evaluation unit 120 is arranged to measure the UE's communication performance over the radio channel on which the UE receives its signals (transmissions from one or more other parties in the system). In addition to this, the evaluation unit 120 also receives the output signal from the sensor 115 of the UE, said signal being indicative of the position of the UE.

According to the invention, the evaluation unit 120 is arranged to generate a first control signal, shown as S1 in FIG. 1, which indicates if altering the position of at least part of the UE, and thereby the position of the UE's antenna unit 130, will result in increased communication performance over the radio channel for the UE. To this end, the evaluation unit will preferably comprise a processing unit such as for example a micro processor, as well as a memory unit. The first control signal S1 can then for example, be generated by means of storing a set of position values which the UE has had in the memory unit, together with the communications quality which the UE had in those positions, and then comparing those with the current position and its communications quality.

The first control signal S1 can then, for example, indicate that non-rotational movement of the UE two meters to the left (as an example) will result in improved communications quality. Other examples of movement which the first control signal S1 can indicate include rotating the lid 105 of the UE 100 in order to bring the angle between the lid and the keyboard closer to ninety degrees, or, in the case of so called tablet PCs, that rotation of the lid in the plane indicated by the axes x-y in FIG. 1 will result in improved communications quality.

As an alternative or complement to this, in one embodiment, the evaluation unit can also be arranged to generate the first control signal S1 by comparing the UE's communication performance at its current position against a calculated communication performance in an alternative position of the UE. Thus, for example, the processor unit mentioned previously as being a possible part of the evaluation unit, determines that an altered position of the lid of the UE will result in improved communications performance of the UE, this can be signaled via the signal S1.

Turning now to the issue of the communication performance as evaluated by the evaluation unit 120 of the UE 100, examples of parameters which the evaluation unit is arranged to use when measuring the UE's communication performance over the radio channel and when generating the first control signal (S1) can include one or more of:
- the data throughput in the UE,
- the delay for received data in the UE,
- the bit error rate for received data in the UE,
- the received bit rate for received data in the UE,
- the bit error pattern for received data in the UE,
- Channel Quality Indicator, CQI statistics.

Figure 2:
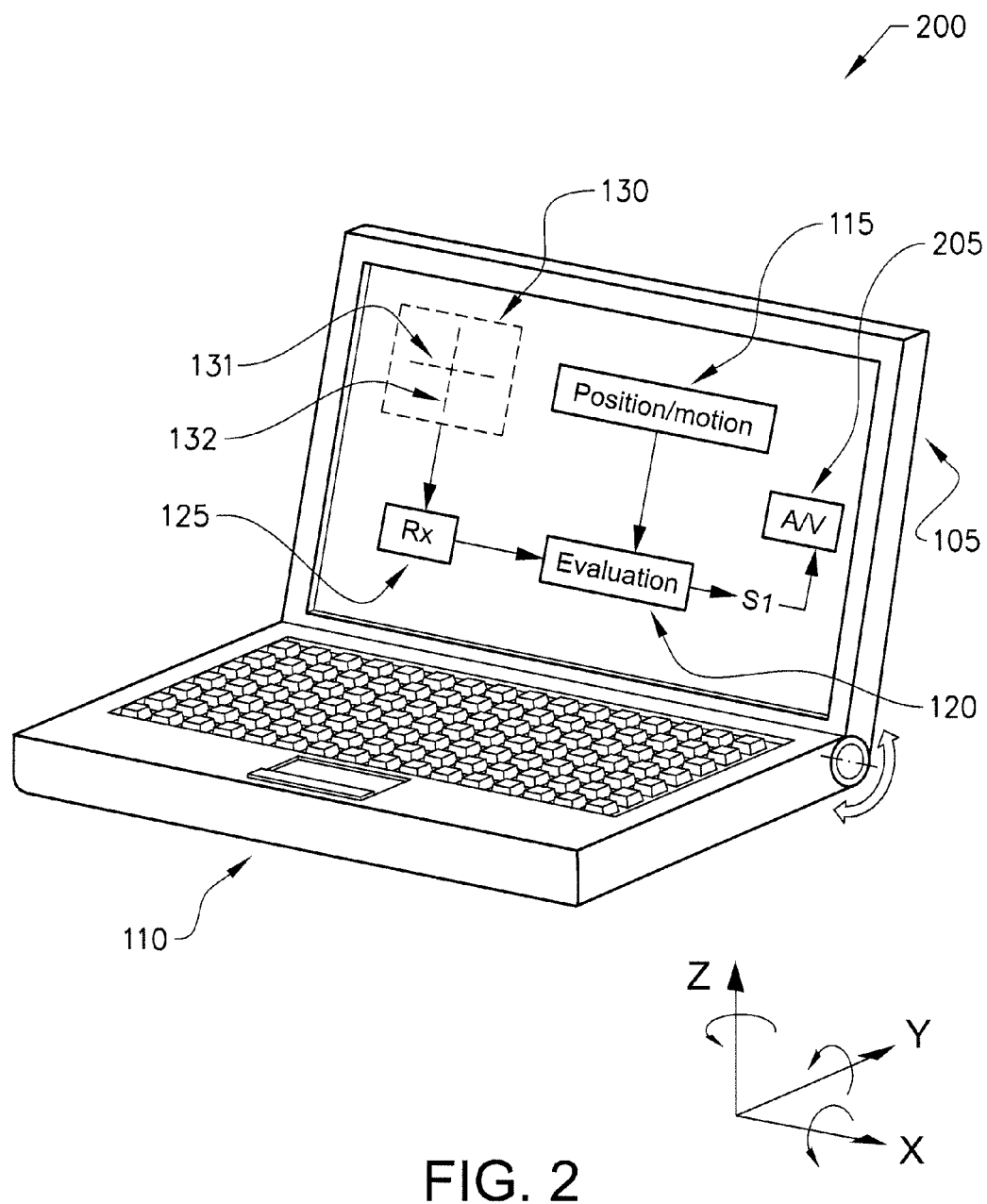

In one embodiment 200 of the UE of the invention, shown in FIG. 2, the UE 200 comprises an indicator 205 which is arranged to generate an audio or visual signal indicative of a movement for the UE as indicated by the first control signal S1. Thus, such an indicator can indicate visually (for example, by means of symbols or in writing) that a certain movement of the UE 200 will result in improved communications performance of the UE. As an alternative, an audio signal can indicate that the UE is in a non-optimal position, and such a signal will then, for example, become increasingly quiet as the UE is moved towards the "correct" position.

In one embodiment, as shown in both FIGS. 1 and 2 by means of the text "position/motion" in the box indicating the sensor 115, the evaluation unit 120 is also arranged to sample the communication performance of the UE at different positions, rotational or geographical, during movement of the UE and to include information about such samples in its output signal, with the evaluation unit 120 being arranged to use this information in generating the first control signal. Thus, as a user of the UE 105 moves about with the UE, the evaluation unit 120 "samples" and stores the communications performance, for example by means of the parameters given previously, in order to enable the evaluation unit to output the signal S1 indicating, for example, "take two steps backwards, one step to the right and rotate the UE 45 degrees clockwise", in order for the UE to obtain improved communications performance.

Turning now to the antenna unit 130 as shown in both FIGS. 1 and 2, the antenna unit preferably comprises at least two sub-antennas, shown as 131 and 132 in the drawings, with the two sub-antennas preferably being of different polarizations, suitably two polarizations which are orthogonal to each other. In such an application, i.e. with two antennas with orthogonal polarizations, two MIMO streams can be transmitted to the UE over the radio channel, one stream on each of the polarizations, and the evaluation unit will detect better communications performance as the antenna sub-unit's orientation coincide with the incident wave which comprises those two streams. (As an alternative, some or all streams can be transmitted on all polarizations.)

Figure 3:
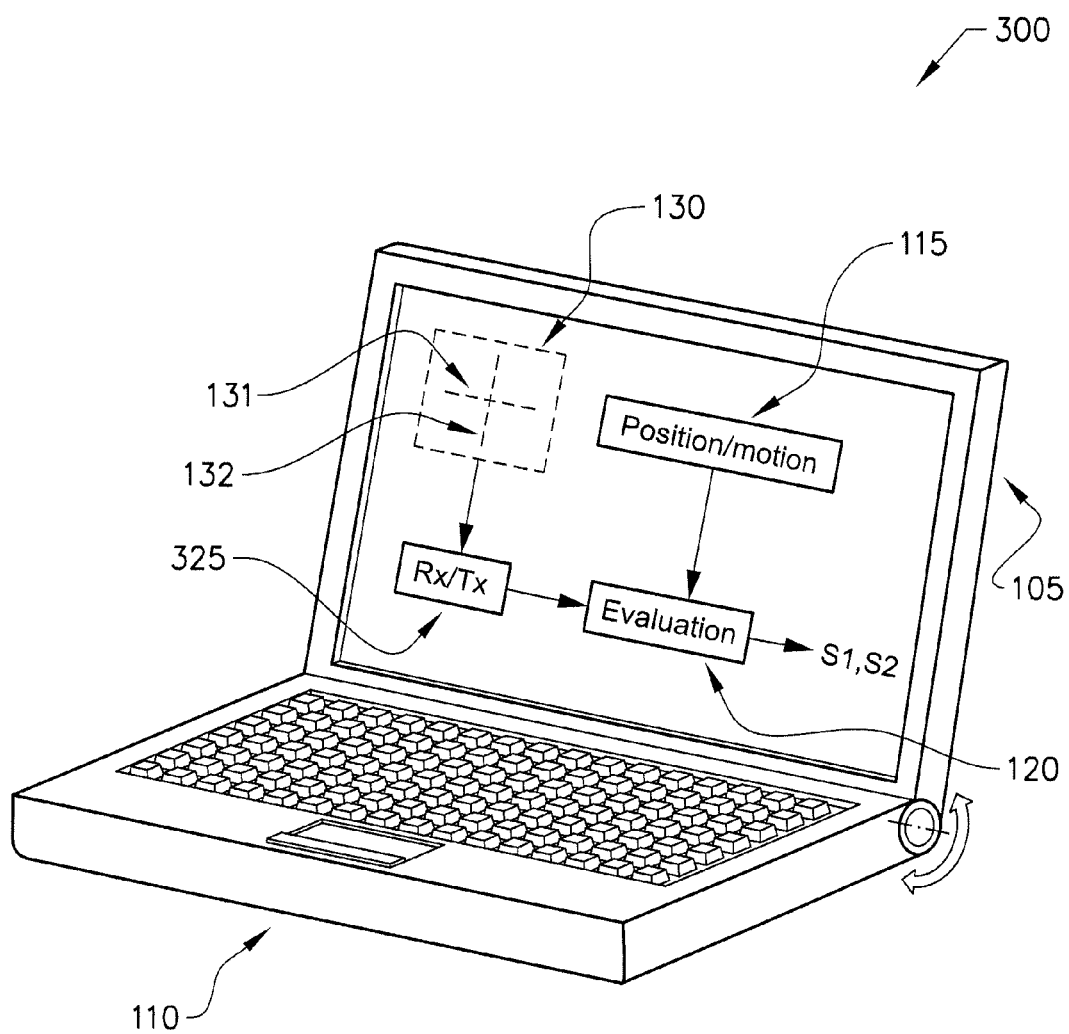

Turning now to FIG. 3, there is shown a further embodiment 300 of the invention: the embodiments shown in FIGS. 1 and 2 are shown as comprising a receiver unit, whilst the embodiment 300 of FIG. 3 also comprises a transmit unit, shown together with a receiver unit as 325. The transmitter unit is arranged to transmit signals over the radio channel with varying rank within the system, in similarity to how the receiver unit is arranged to receive signals with varying rank. As an alternative or complement, the transmitter unit can be arranged to transmit different signals over the different transmit antennas, i.e. so called reference symbols from which the supported rank can be derived. This alternative or complement can also be used in a corresponding manner in the receiver unit when determining the rank.

In embodiments which also comprise a transmit unit, the evaluation unit 120 is preferably also arranged to generate a second control signal, shown as S2 in FIG. 3, which indicates if altering the position of at least part of the UE will provide an improved communication performance of the transmitted signals, and if so, how the position should be altered. Preferably but not necessarily, the second signal, S2, is based on the first signal S1, and can in fact be the same in some embodiments. However, since the transmit signals are intended for one or more other parties in the system, those parties can also transmit "feedback" information to the UE 300, informing it of their received signal quality and/or rank, information which can in some embodiments be used by the evaluation unit to when generating the second control signal S2.

Figure 4:
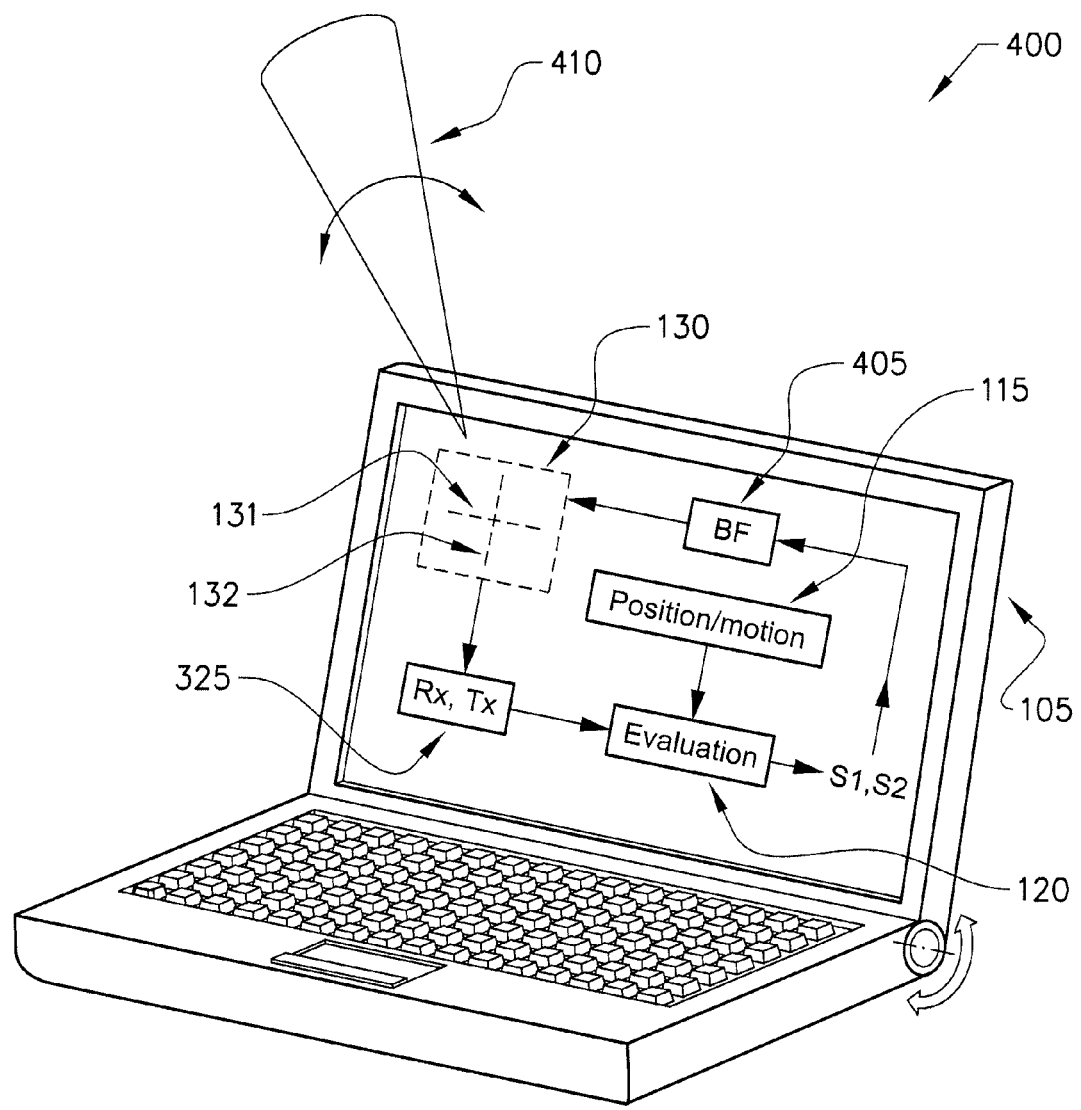

A further embodiment 400 of the UE of the invention is shown in FIG. 4: in this embodiment, the antenna unit 130 of the UE 400 has one or more electrically steerable beams 310, and is arranged to steer such a beam or beams by the first control signal in order to obtain an increased MIMO rang. The beam steering information is primarily intended for the uplink (transmit) case, although it can of course also be used in the downlink (receive) case. The UE 400 with the steerable beam or beams suitably also comprises a beam forming network or function BF 405, which serves to receive information from the evaluation unit and to use this information when forming the steerable beam or beams. Naturally, the BF network/function can also receive such input data from a control unit in the UE, or form both the evaluation unit and a control unit.

Figure 5:
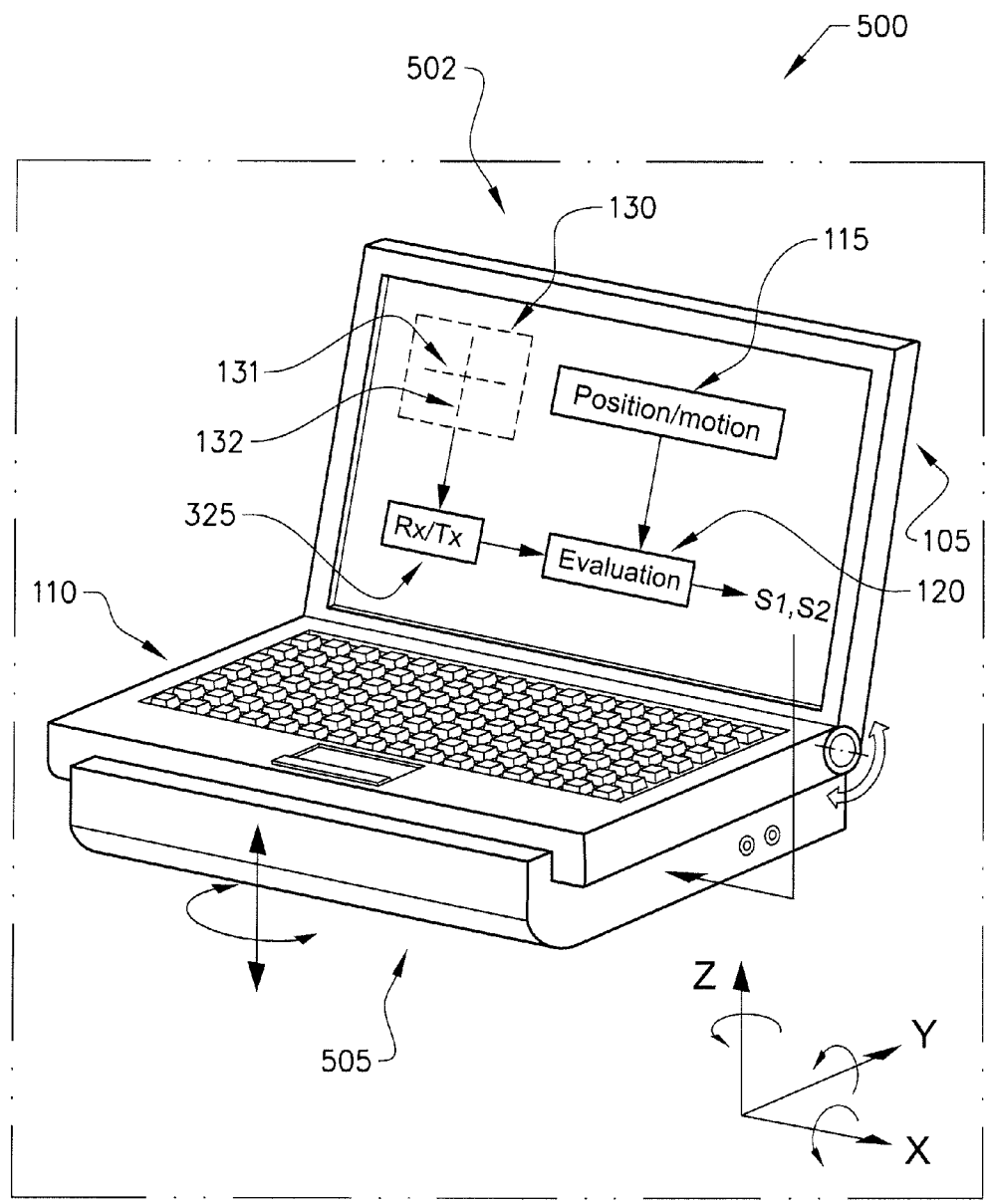

FIG. 5 shows another embodiment of the invention: this embodiment 500 is a system which comprises a UE 502 in any and all of the embodiments as described and envisioned herein, as well as a powered docking station 505 for placing the UE in. According to the invention, the docking station 500 is arranged to receive at least the first control signal S1, and uses this control signal in order to alter the position of at least part of the UE 502 in a manner indicated by said control signal. Thus, in this embodiment, a user of the UE simply places his UE in the docking station, which then automatically alters the position of the UE in order to find a position for the UE which ensures good communications performance. The main direction in which the docking station 505 is arranged to alter the position of the UE are rotational directions and "up/down" movements", both movements in the direction indicated as in the coordinate system of FIG. 5, as well as the "elevation angle" of the UE 500, i.e. rotation about one or both of the "y" and "x" axes.

As mentioned, the UE of the invention can be one of a wide range of portable devices which can be used within a wireless system, such as cellular or mobile telephones, lap top or notebook computers etc. Examples of the wireless system in which the UE of the invention can be used are also varying, but examples which can be mentioned are so called 2G and 3G systems such as GSM, CDMA, WCDMA, HSPA, WiMAX and TD-SCDMA as well as LTE systems.

In one embodiment, the evaluation unit is arranged to compile and display a "Top-5" list in which the UE's best "bit rate positions" are displayed, and alternatively, or as a complement, the direction and distance to the nearest previous "good-spot".

The invention is not limited to the examples of embodiments described above and shown in the drawings, but may be freely varied within the scope of the appended claims.

The invention claimed is:

1. A user terminal (UE) for a wireless communications system, the UE comprising:
   an antenna unit and a receiver unit for receiving signals on a radio channel within the system, the antenna unit having one or more electrically steerable beams and being arranged to steer said beam or beams by a first control signal;
   a sensor, within the UE, for sensing the position of the UE and for generating an output signal to the evaluation unit indicative of said position; and
   an evaluation unit which is arranged to measure the UE's communication performance over the radio channel, to receive the output signal from the sensor within the UE, and to generate the first control signal, which indicates whether altering the position of at least part of the UE, and thereby the position of the UE's antenna unit, will result in an increased communication performance over the radio channel for the UE, to obtain an increased Multiple-Input, Multiple-Output (MIMO) range.

2. The UE of claim 1, being a UE that is also arranged for MIMO use within the wireless communications system, with the antenna unit and the receiver unit of the UE being arranged to receive signals on said radio channel with varying radio channel radio-channel rank, wherein the evaluation unit is also arranged to measure the radio channel radio-channel rank of the signals on the radio channel as received by the UE and to generate the first control signal so that the first control signal indicates whether altering the position of the UE will result in increased communication performance for the UE by means of obtaining an altered radio channel radio-channel rank.

3. The UE of claim 1, in which the evaluation unit is arranged to use at least one of the following parameters when measuring the UE's communication performance over the radio channel and when generating the first control signal:
   a data throughput in the UE;
   a delay for received data in the UE;
   a bit error rate for received data in the UE;
   a bit rate for received data in the UE;
   a bit error pattern for received data in the UE; and
   Channel Quality Indicator, CQI, statistics.

4. The UE of claim 1, wherein the sensor is arranged to sense the position of the UE by sensing the geographical position of the UE.

5. The UE of claim 1, wherein the sensor is arranged to sense the position of the UE by sensing the rotational position of the UE.

6. The UE of claim 1, in which the evaluation unit is arranged to generate the first control signal by comparing the UE's communication performance at its current position against one or both of:
   a measured communication performance in at least one previous position of the UE; and
   a calculated communication performance in an alternative position of the UE.

7. The UE of claim 1, in which the evaluation unit is also arranged to sample the communication performance of the UE at different positions, rotational or geographical, or both, during movement of the UE, and to include information about such samples in its output signal, the evaluation unit being arranged to use this information in generating the first control signal.

8. The UE of claim 1, comprising an indicator arranged to generate an audio or visual signal indicative of a movement for the UE indicated by the first control signal.

9. The UE of claim 1, in which the antenna unit comprises at least two sub-antennas of different polarizations.

10. The UE of claim 1, also comprising a transmitter unit for transmitting signals over a radio channel with varying rank within the system, wherein the evaluation unit is also arranged to generate a second control signal that indicates whether altering the position of at least part of the UE will provide an improved communication performance of the transmitted signals, and, if so, how said position should be altered.

11. The UE of claim 10, in which the second control signal is based on the first control signal.

12. The UE of claim 10, in which the evaluation unit is arranged to receive feedback signals from another party in the system to which the UE transmits, and to use said feedback signals in order to generate the second control signal.

13. A system comprising the UE of claim 1 and further comprising a powered docking station for placing the UE in, said docking station being adapted to receive at least the first control signal and to alter the position of at least part of the UE in a manner indicated by said control signal.

* * * * *

UNITED STATES PATENT AND TRADEMARK OFFICE
CERTIFICATE OF CORRECTION

PATENT NO.            : 8,494,558 B2                                                     Page 1 of 1
APPLICATION NO.       : 13/519366
DATED                 : July 23, 2013
INVENTOR(S)           : Jonsson et al.

It is certified that error appears in the above-identified patent and that said Letters Patent is hereby corrected as shown below:

In the Specification

In Column 2, Line 42, delete "CQI statistics)" and insert -- CQI statistics --, therefor.

In Column 3, Line 67, delete "UE 115." and insert -- UE 100. --, therefor.

In Column 6, Line 8, delete "docking station 500" and insert -- docking station 505 --, therefor.

In Column 6, Line 20, delete "UE 500," and insert -- UE 502, --, therefor.

Signed and Sealed this
Twenty-eighth Day of January, 2014

Michelle K. Lee
*Deputy Director of the United States Patent and Trademark Office*